Oct. 21, 1969  M. E. REINECKE  3,473,377
MASS FLOWMETER
Filed Feb. 27, 1967  2 Sheets-Sheet 1

INVENTOR.
M. E. REINECKE
BY Young & Quigg
ATTORNEYS

Oct. 21, 1969 M. E. REINECKE 3,473,377

MASS FLOWMETER

Filed Feb. 27, 1967 2 Sheets-Sheet 2

INVENTOR.
M.E. REINECKE
BY Young + Quigg
ATTORNEYS though the conduit. The magnitudes of these pulses are integrated over said preselected period as defined above which is proportional to $1/f$ and since $f$ (frequency of occurrence of the pulses) is directly proportional to $v$, $1/f$ is proportional to $1/v$. Consequently, the resulting integrated output is effectively the quotient of $\rho v^2/v$, which is equal to $\rho v$, the mass flow rate of the fluid flowing through the conduit.

United States Patent Office 3,473,377
Patented Oct. 21, 1969

3,473,377
MASS FLOWMETER
Marvin E. Reinecke, Bartlesville, Okla., assignor to Phillips Petroleum Company, a corporation of Delaware
Filed Feb. 27, 1967, Ser. No. 618,728
Int. Cl. G01f 1/02
U.S. Cl. 73—194                                    4 Claims

ABSTRACT OF THE DISCLOSURE

A mass flow rate measuring instrument which utilizes a vortex-inducing device inserted in a fluid stream as the basic transducing element in conjunction with means for monitoring the pressure and precessional frequency characteristics of the induced vortex and converting the physical characteristics of the vortex into a representation of the mass flow rate.

---

Figure 1:
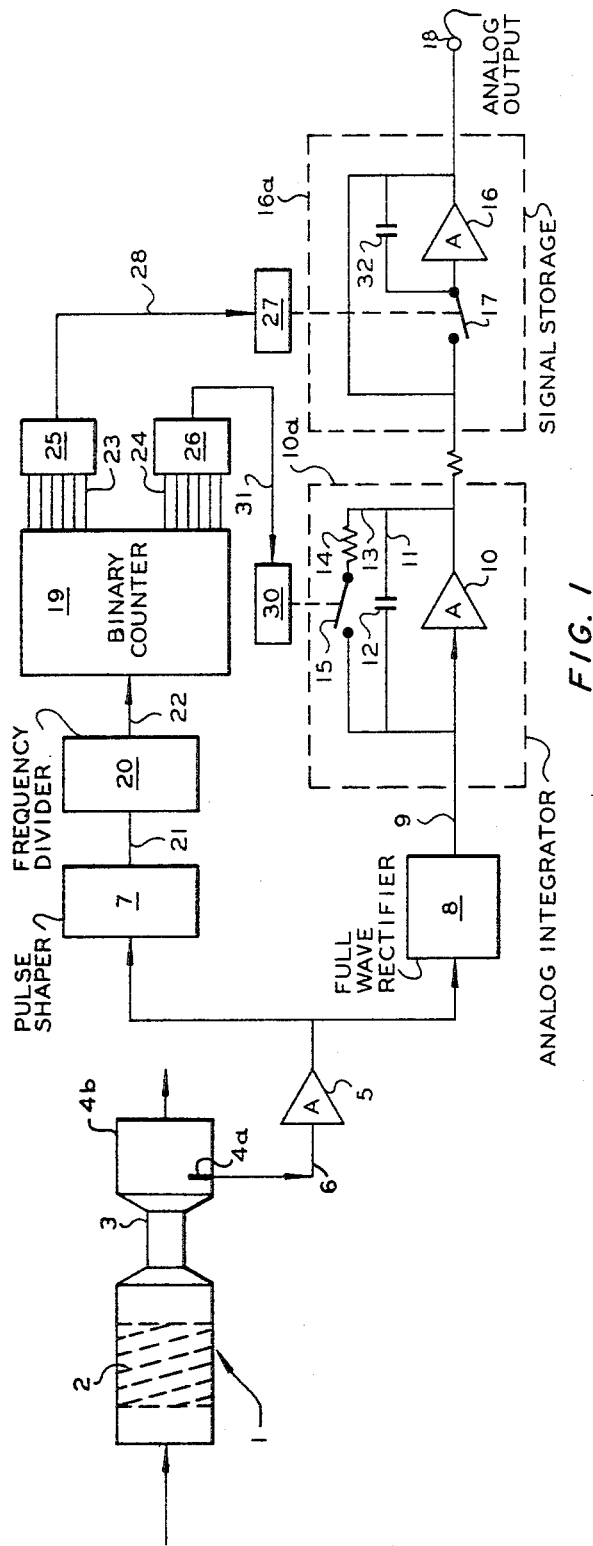

This invention relates to a mass flowmeter. In another aspect, this invention relates to the direct measurement of mass flow rate of a fluid through a conduit independent of density variations.

Measurement of mass flow rate is achieved by various methods which are either relatively inaccurate or involve complex apparatus. Various methods used or proposed are density-compensated variable area meters, meters dependent upon measurement of momentum, meters dependent upon inherent volumetric flow rate measurements combined with specific gravity-sensing means, and various turbine flow meters.

Recently, it has been discovered that various vortex-inducing instruments which are inserted within fluid conduits and produce uniform but highly vortexing flow can be used in the determination of the volumetric flow rate of a fluid flowing through a conduit. Specifically, it has been found that the precessional frequency of the vortexing fluid about the center line through the conduit is directly proportional to the velocity of the flow of the fluid in the conduit. These vortex-generating instruments can merely be helical screws or fixed fan blades within a fluid conduit, or can be the dual chamber vortex whistle device disclosed in U.S. Patent 2,794,341. Since these instruments have no moving parts and are relatively simple to install they have become highly useful in the measurment of fluid flow. However, as illustrated above, most mass flow rate indicating instruments are relatively complex mechanisms and require much maintenance and calibration, especially of the transducing elements. Therefore, there is needed a mass flow rate measuring instrument which utilizes the vortex generator with its simple construction as the basic transducing element thereof.

Thus, the object of this invention is to provide a mass flow rate measuring instrument which utilizes the properties of the vortex created in a vortex generator to provide an indication of mass flow rate of a fluid flowing therethrough.

According to the present invention a mass flowmeter is provided which will measure the mass flow rate of a fluid flowing therethrough to a high degree of accuracy. Its principle involves the measurement of two flow characteristics, each of which provides an output, with the further provision of combining the outputs, the combination of outputs being in units of mass flow rate. According to one embodiment of this invention, a vortex-generating device is inserted in a fluid conduit and a force impact member such as a piezoelectric probe is mounted in the outlet thereof. The frequency of precession of the vortex induced by the vortex generator is measured by the probe. A predetermined number of vibrations of the vortex is measured to obtain the time period which is in turn inversely porportional to the frequency. Also, the magnitude of each pulse (force exerted by the fluid on the impact member in the direction of flow) is proportional to $\rho v^2$ when $\rho$ is the density of the fluid flowing through the conduit and $v$ is the volumetric flow rate of this fluid. The magnitudes of these pulses are integrated over said preselected period as defined above which is proportional to $1/f$ and since $f$ (frequency of occurrence of the pulses) is directly proportional to $v$, $1/f$ is proportional to $1/v$. Consequently, the resulting integrated output is effectively the quotient of $\rho v^2/v$, which is equal to $\rho v$, the mass flow rate of the fluid flowing through the conduit.

According to another embodiment of this invention, a vortex generator is inserted into a conduit. The pressure drop across the vortex is measured, or the pressure drop through a flow restriction device placed either upstream or downstream from the vortex generator is measured. When any such vortex generator or flow restriction device is placed in a conduit, it produces a pressure change in the conduit, and the resulting pressure drop is proportional to $\rho v^2$. This quantity is again integrated over a preselected time period which is proportional to $1/f$ to yield a resulting integrated output $\rho v^2/v$ which is indicative of mass flow rate. The precessional frequency of the vortex can be measured through a piezoelectric probe as used above or a microphone or any other device known in the art which will measure the frequency of vibrations of fluid rotating within the vortex generator.

Figure 2:
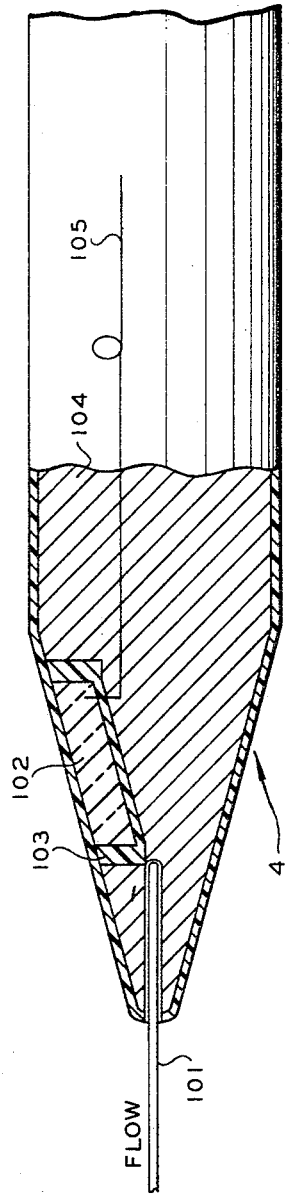
Figure 3:
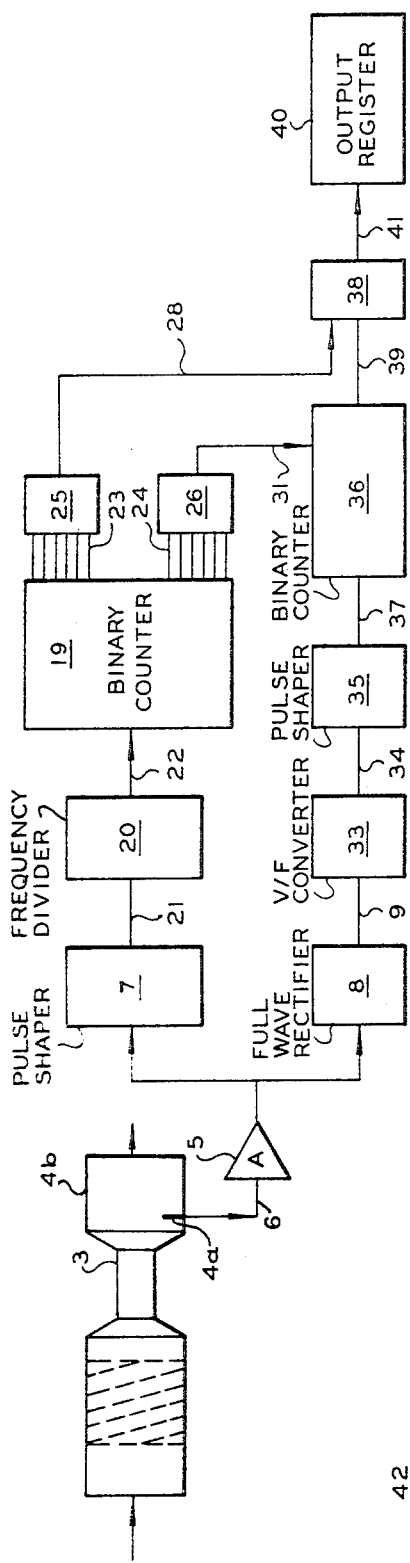
Figure 4:
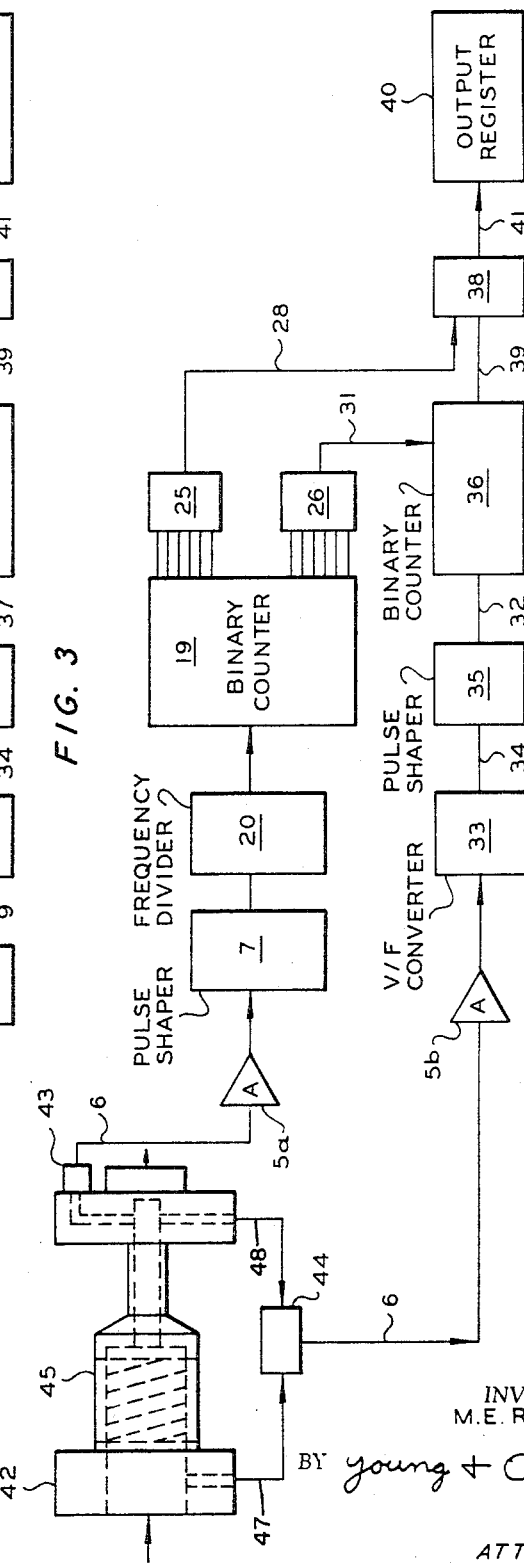

This invention can be more easily understood from a study of the drawings in which:

FIGURE 1 is a schematic circuit diagram of one embodiment of this invention for producing an analog output which is proportional to the mass flow rate of the fluid flowing through the conduit. FIGURE 2 is a sectional view of a piezoelectric transducing element. FIGURE 3 is a schematic circuit diagram of another embodiment of this invention for producing a digital output which is proportional to the mass flow rate of a fluid through the conduit. FIGURE 4 is a schematic circuit diagram of another embodiment of this invention.

Now referring to FIGURE 1, there is illustrated one embodiment of this invention for producing an analog output which is indicative of the mass flow rate of a fluid. Vortex generator 1 is normally connected into a conduit which transports fluids. Stationary fins 2 induce a swirling motion to the fluid in vortex generator 1 and result in a highly vortexing flow being formed as the fluid enters narrowed chamber 3. Any other type vortex-generating apparatus can be used in the operation of this invention. For example, the vortex whistle as disclosed in U.S. Patent 2,794,341 can be used to create the highly vortexing flow within the fluid conduit. Probe 4a is located in enlarged section 4b near the outlet end of chamber 3 and can be any type of stable sensor that is capable of measuring the frequency of rotation of and the force exerted by the vortexing fluid within chamber 4b. Preferably, however, probe 4a is a piezo-resistance type transducing device. A suitable device which can be used in the operation of this invention is the piezoelectric airfoil probe illustated on page 44 of Design News magazine vol. 21, No. 7, published Mar. 30, 1966.

FIGURE 2 is a cross section of a suitable piezoelectric airfoil probe. Piezoelectric element 102 is enclosed within a flexible plastic covering such as an epoxy resin 103. As probe 101 vibrates within metal body 104 due to the pressure of the fluid flow the vibrations from the inward end thereof contact covering 103 and produces pressure on piezoelectric element 102. As a result, electric pulses pass to lead 6 (FIGURES 1 and 2) via conductor 105. Thus, the movement of probe 101 produces pulses not only representative of the precessional frequency of the fluid in the vortex but also of the relative magnitude of these pulses or the force exerted against probe 101. The magnitude of the force applied on probe 101 as the fluid within chamber 4b is rotating is proportional to $\rho v^2$, and piezoelectric element 102 provides signal outputs in the form of analog pulses, the magnitudes of which are proportional to the force exerted by the swirling of fluid on probe 101. The sequence of the pulses is proportional to the frequency $f$ at which the fluid is rotating around the periphery of chamber 4b.

Referring again to FIGURE 1, the frequency of the pulses transmitted from lead 6 to amplifier 5 actuates the logic system which comprises pulse shaper 7, frequency divider 20, binary counter 19, gates 25 and 26, and switching relays 27 and 30. The magnitude of the pulses transmitted to amplifier 5 actuates the integration system which comprises full wave rectifier 8, analog integrator 10a, and signal storage device 16a. The output of the instrument which is in units of mass flow rate is passed to terminal 18. Terminal 18 can be attached to any suitable means for recording or presenting the analog signal outputs as desired.

Therefore, the AC output from probe 4a is transmitted to AC amplifier 5 via lead 6. AC amplifier 5 can be any type of alternating current amplifier known in the art. The amplified signal therefrom is next simultaneously transmitted to pulse shaper 7, and to full wave rectifier 8. Full wave rectifier 8 can be any type full wave rectifier known in the art. The resulting signals from rectifier 8 are transmitted to analog integrator 10a via lead 9. Analog integrator 10a comprises amplifier 10, feedback circuit 11 containing capacitance 12 therein, and circuit 13 containing resistance 14, and switch 15 which is connected parallel to circuit 11. When switch 15 is closed, capacitance 12 is discharged to thereby reset the analog integrator. However, at the initiation of the integration cycle switch 15 is in the open position as illustrated in FIGURE 1. The integrated signal from analog integrator 10a is passed to signal storage device 16a when switch 17 is in closed position. From signal storage device 16a the integrated output is transferred to terminal 18.

Switches 15 and 17 are controlled by the logic system as briefly defined above. To operate the logic system the AC pulses are passed to pulse shaper 7 via channel 6. Pulse shaper 7 can be any known device that will transform the AC signals to square wave pulses required to trigger succeeding digital circuitry. A suitable pulse shaper is the W501 Schmitt trigger manufactured by Digital Equipment Corporation of Maynard, Mass., and illustrated in their catalog, "The Logic Handbook," Catalog No. 105. The resulting shaped signals are then passed to frequency divider 20 via lead 21. Frequency divider 20 can be any type of frequency dividing device known in the art which will provide an output of a reduced number of pulses per unit of time with respect to the frequency of the input. A suitable frequency divider is the R202 flipflop illustrated in FIGURE 20 of page 14 of "The Logic Handbook Catalog No. 105" of Digital Equipment Corporation, Maynard, Mass. The pulses from frequency divider 20 are then passed to binary counter 19 via lead 22. Counter 19 as shown is a six-bit counter which will therefore count up to 64 pulses transmitted from frequency divider 20. This in effect will establish a time period containing a known number of pulses for each counting cycle and will thereby establish the fraction $1/f$ which is known to be proportional to the established period. However, it must be noted that it is within the scope of this invention to utilize any other desired counting sequence such as 16, 32, 128, etc. Also, it is within the scope of this invention to use any other type counter such as the decimal, duodecimal, etc.

As illustrated in FIGURE 1, parallel outputs illustrated as 23 and 24 from counter 19 are fed to gates 25 and 26, respectively. Counter 19 stores each pulse for 64 counts and then again repeats the counting operation. As stated, during this time, switches 15 and 17 are in the open position as illustrated in FIGURE 1 and analog integrator 10a is integrating the magnitude of the pulses which are representative of $\rho v^2$. On the 63rd count, a pulse is passed from gate 25 to relay 27 via lead 28. This pulse actuates relay 27 and causes switch 17 to momentarily close. The integrator voltage level is then passed from analog integrator 10a to signal storage device 16a. This signal level is retained within capacitor 32 and the difference in the voltage between the new integrated output and the integrated output of the previous measurement is transferred to output register 18. Thus, the voltage level stored within capacitance 32 is retained therein until a new cycle is completed. On the next 63rd count binary counter 19 will again cause gate 25 to pass a signal to relay 27 via channel 28 and again cause switch 17 to close. On the 64th count, the integrator is reset. This is accomplished by a signal which is passed from gate 26 on the 64th count to relay 30 via channel 31. Relay 30 is then actuated and momentarily closes switch 15 to thereby reset analog integrator 10a. Next, the frequency divider scales the incoming signal to allow proper dead time for analog integrator 10a to be reset during the 64th count interval. Thus, the output represents integrated analog information for $63/64$ of the time, when utilizing a six-bit binary counter. Gates 25 and 26 can be any suitable gating mechanism known in the art. For example, if relays 27 and 30 are actuated by a positive pulse (inhibit pulse) then gates 25 and 26 can be the standard AND gates; however, if relays 27 and 30 are actuated by the absence of an inhibit pulse, the gates 25 and 26 can be standard NAND gates. Suitable AND and NAND gates are illustrated in the "Logic Handbook," Catalog No. 105 issued by Digital Equipment Corporation, Maynard, Mass.

FIGURE 3 is a schematic circuit diagram of one embodiment of this invention for producing a digital output which is proportional to the mass flow rate of a fluid flowing through a conduit. The logic system which comprises pulse shaper 7, frequency divider 20, binary counter 19 and gates 25 and 26 is exactly the same as the logic system as illustrated in FIGURE 1. However, the integration system comprises a full wave rectifier 8, voltage-to-frequency converter 33, pulse shaper 35, binary counter 36, and gate 38. Output register 40 is also modified to receive the digital output. Thus, in the operation of the flowmeter, the logic system will function in exactly the same way as the logic system of FIGURE 1. The integration system will basically function in the same way except that the analog pulses are converted into digital form in order to trigger the succeeding circuitry. Therefore, the rectified signals from full wave rectifier 8 are passed to voltage-to-frequency converter 33 via lead 9. The frequency pulses which correspond to the voltage input are then transferred to pulse shaper 35 via lead 34. Pulse shaper 35 can be the same Schmitt trigger device as pulse shaper 7 and voltage-to-frequency converter can be any converter known in the art such as the D1–2212A voltage-to-frequency converter illustrated on page 158 of the Hewlett Packard Catalog No. 25. The shaped pulses are then passed to binary counter 36 via lead 37 and counted until a reset signal is transferred from gate 26 via lead 31. Again, when the 63rd pulse is counted gate 25 is triggered and a signal is passed to gate 38 via lead 28 which thereby allows a signal representative of the counted pulses from binary counter 36 to pass to output register 40 via lead 41. Gate 38 is the standard NAND gate as discussed in connection with FIGURE 1. The 64th pulse from binary counter 19 will then trigger gate 26 and a reset pulse will be sent to binary counter 36 via channel 31 to thereby reset the counter for the next counting cycle. Thus, it can be readily seen that the operation of digital output device of FIGURE 3 is substantially the same as the analog output device of FIGURE 1.

FIGURE 4 illustrates another embodiment of this invention wherein the pressure in the circuit at housing 42 is transmitted through lead 47 to differential cell 44 where it is compared with the pressure from lead 48 to obtain a pressure differential which is utilized to obtain the quantity $\rho v^2$. Microphone 43 is utilized to obtain the frequency of the vortexing fluid at the output of vortex generator 45. However, any sensing device known in the art can be used for this purpose, such as the piezoelectric probe described in connection with FIGURE 1 or a hot film resistant anemometer. The logic system of this device comprises alternating current amplifier 5a, pulse shaper 7, frequency divider 20, binary counter 19, and gates 25 and 26. As illustrated, this logic system is exactly the same as the logic system of FIGURES 1 and 3 with the exception of alternating current amplifier 5a. The integration system comprises alternating current amplifier 5b, voltage-to-frequency convertor 33, pulse shaper 35, binary counter 36, gate 38, and output register 40. This integration system corresponds to the digital integration system illustrated in FIGURE 3; however, the analog integration system illustrated in FIGURE 1 can also be used for this embodiment. The operation of this device is exactly the same as the operation of the device of FIGURE 3 except that microphone 43 provides the pulses representative of the frequency of the vortexing fluid within the outlet end of vortex generator 45 and differential pressure cell 44 provides a measure of the magnitude for $\rho v^2$.

It will be evident that numerous variations can be made in the embodiments of this invention. Therefore, the embodiments of this application are not intended to be limiting in light of the disclosure therein.

I claim:

1. A mass flow rate indicating instrument which comprises (a) a vortex-inducing means to impart a vortex-forming rotational movement to a fluid flowing from the inlet to the outlet thereof, (b) means juxtaposed to said vortex-inducing means for providing a first output substantially proportional to $\rho v^2$ wherein $\rho$ is equal to the density of the fluid and $v$ is equal to the velocity of the fluid flowing through said vortex-inducing means, (c) means juxtaposed to said vortex-inducing means for providing a second output substantially proportional to $v$, and (d) means for receiving said outputs and providing an indication of the quotient of the value of said first output by the value of said second output comprising means to amplify said first and second outputs, full wave rectifier means, means to pass the amplified first output signal to said full wave rectifier means, integrator means, means to pass the rectified signal from said full wave rectifier means to said integrator means, signal storage means, means to pass integrated signals from said integrator means to said signal storage means, pulse shaping means, means to pass the amplified second output signals to said pulse shaping means, frequency dividing means, means to pass pulses from said pulse shaping means to said frequency dividing means, counting means to count a predetermined number of pulses from said frequency divider means, means to pass pulses from said frequency divider means to said counter means, first and second gate means to receive outputs from said counter means, means to pass a signal from said first gate to said signal storage means, and means to pass a reset signal from said second gate means to said integrator means.

2. The apparatus of claim 1 wherein said counting means is a binary counter.

3. A mass flow rate indicating instrument which comprises (a) a vortex-inducing means to impart a vortex-forming rotational movement to a fluid flowing from the inlet to the outlet thereof, (b) means juxtaposed to said vortex-inducing means for providing a first output substantially proportional to $\rho v^2$ wherein $\rho$ is equal to the density of the fluid and $v$ is equal to the velocity of the fluid flowing through said vortex-inducing means, (c) means juxtaposed to said vortex-inducing means for providing a second output substantially proportional to $v$, and (d) means for receiving said outputs and providing an indication of the quotient of the value of said first output by the value of said second output comprising means to amplify said first and second outputs, full wave rectifier means, means to pass the amplified first output signals to said full wave rectifier means, voltage-to-frequency convertor means, means to pass rectified signals from said full wave rectifier means to said voltage-to-frequency convertor means, pulse shaper means, means to pass signals from said voltage-to-frequency convertor means to said pulse shaper means, a first counting means, means to pass shaped pulse signals from said pulse shaper means to said first counting means, a first gate means for passing signals from said first counter means therethrough, output register means, means for passing signals from said first gate means to said output register means, a second pulse shaper means, means to pass the amplified second output signals to said pulse shaper means, frequency divider means, means to pass shaped signals from said pulse shaper to said frequency divider means, a second counter means, means to pass signals from said frequency divider means to said first counter means, second and third gate means to pass signals from second counter means, means to pass a signal from said second gate means to said first gate means, and means to pass a reset signal from said second gate means to said first counting means.

4. The apparatus of claim 2 wherein said first and second counter means are binary counters.

References Cited

UNITED STATES PATENTS

| 2,772,567 | 12/1956 | Boden et al. | |
| 2,794,341 | 6/1957 | Vonnegut. | |
| 3,115,777 | 12/1963 | Hochreiter. | |
| 3,279,251 | 10/1966 | Chanaud. | |
| 3,307,396 | 3/1967 | Griffo | 73—214 X |

FOREIGN PATENTS

| 148,254 | 12/1962 | U.S.S.R. |

RICHARD C. QUEISSER, Primary Examiner

JOHN K. LUNSFORD, Assistant Examiner

U.S. Cl. X.R.

73—205